(12) United States Patent
Yang et al.

(10) Patent No.: US 7,712,794 B2
(45) Date of Patent: May 11, 2010

(54) RAPID COUPLING DEVICE FOR HYDROGEN STORAGE CANISTER

(75) Inventors: Jefferson Y S Yang, Orange, CA (US); Yao-Sheng Hsu, Taipei (TW)

(73) Assignee: Asia Pacific Fuel Cell Technologies, Ltd., Miaoli (TW)

( * ) Notice: Subject to any disclaimer, the term of this patent is extended or adjusted under 35 U.S.C. 154(b) by 923 days.

(21) Appl. No.: 11/491,982

(22) Filed: Jul. 25, 2006

(65) Prior Publication Data

US 2006/0255589 A1 Nov. 16, 2006

Related U.S. Application Data

(63) Continuation-in-part of application No. 10/428,466, filed on May 2, 2003, now abandoned.

(51) Int. Cl.
*F16L 37/18* (2006.01)
(52) U.S. Cl. .................................. 285/316; 137/614.04
(58) Field of Classification Search ................. 285/280, 285/307, 308, 314, 315, 316, 317, 84, 85, 285/86, 38; 137/614.04
See application file for complete search history.

(56) References Cited

U.S. PATENT DOCUMENTS

| | | | | |
|---|---|---|---|---|
| 2,279,146 A | * | 4/1942 | Schneller | 285/277 |
| 2,344,740 A | * | 3/1944 | Shaff | 285/277 |
| 2,377,812 A | * | 6/1945 | Scheiwer | 285/277 |
| 2,898,963 A | * | 8/1959 | Courtot | 411/327 |
| 3,028,179 A | * | 4/1962 | Abramoska | 285/317 |
| 3,097,867 A | * | 7/1963 | Saloum | 285/86 |
| 3,314,447 A | * | 4/1967 | Collar et al. | 137/614.06 |
| 3,420,497 A | * | 1/1969 | Wilcox | 251/149.6 |
| 3,550,626 A | * | 12/1970 | Cadley et al. | 137/614.03 |
| RE27,365 E | * | 5/1972 | German | 251/149.6 |
| 3,667,566 A | * | 6/1972 | Hopkins | 180/89.15 |
| 3,710,823 A | * | 1/1973 | Vik | 137/594 |
| 4,068,869 A | * | 1/1978 | Maruyama | 285/316 |
| 4,240,466 A | * | 12/1980 | Herzan et al. | 137/614.04 |

(Continued)

FOREIGN PATENT DOCUMENTS

EP    184702 A2 * 6/1986

(Continued)

OTHER PUBLICATIONS

Communication including a Search Report from the European Patent Office regarding a corresponding European Patent Application 03 02 1823 dated Dec. 19, 2007.

*Primary Examiner*—Aaron M Dunwoody
(74) *Attorney, Agent, or Firm*—Rosenberg, Klein & Lee (57) ABSTRACT

A rapid coupling device couples a hydrogen storage canister and a fuel cell. The rapid coupling device includes first and second coupling assemblies. The first coupling assembly includes a base, and a communicating member coupled to the fuel cell, and carrying a first ejector, a separating member embracing the base, a moving member reciprocating longitudinally inside the base, and elastic members therebetween. The base is provided with abutting members which, depending on the respective positions of the moving member and the separating member control interconnection between the first and second coupling assemblies. The second coupling assembly includes a body carrying a second ejector and lockable inside the base for connection of the first and second ejectors.

16 Claims, 8 Drawing Sheets

U.S. PATENT DOCUMENTS

| | | | |
|---|---|---|---|
| 4,269,389 A * | 5/1981 | Ekman | 251/149.6 |
| 4,403,959 A * | 9/1983 | Hatakeyama | 433/126 |
| 4,465,097 A * | 8/1984 | Suzuki et al. | 137/614.04 |
| 4,485,845 A * | 12/1984 | Brady | 137/614.04 |
| 4,540,201 A * | 9/1985 | Richardson | 285/101 |
| 4,582,347 A * | 4/1986 | Wilcox et al. | 285/12 |
| 4,615,546 A * | 10/1986 | Nash et al. | 285/26 |
| 4,844,513 A * | 7/1989 | St. Louis et al. | 285/39 |
| 4,982,761 A * | 1/1991 | Kreczko et al. | 137/614.03 |
| 5,179,976 A * | 1/1993 | Boland et al. | 137/614.06 |
| 5,290,009 A * | 3/1994 | Heilmann | 251/149.6 |
| 5,323,812 A * | 6/1994 | Wayne | 137/614.05 |
| 5,443,291 A * | 8/1995 | Stucchi et al. | 285/316 |
| 5,445,358 A * | 8/1995 | Anderson | 251/149.6 |
| 5,607,139 A * | 3/1997 | Kjellberg | 251/149.6 |
| 5,873,386 A * | 2/1999 | Arosio | 137/614.02 |
| 5,927,683 A * | 7/1999 | Weh et al. | 251/149.6 |
| 6,015,209 A | 1/2000 | Barinaga et al. | |
| 6,062,606 A * | 5/2000 | Carpini et al. | 285/38 |
| 6,073,974 A * | 6/2000 | Meisinger et al. | 285/86 |
| 6,131,961 A * | 10/2000 | Heilmann | 285/316 |
| 6,398,268 B1 * | 6/2002 | Takahashi et al. | 285/316 |
| 6,505,863 B2 * | 1/2003 | Imai | 285/316 |
| 6,511,100 B1 * | 1/2003 | Le Clinche | 285/316 |
| 6,523,863 B2 * | 2/2003 | Ishiwata | 285/316 |
| 6,568,717 B1 * | 5/2003 | Le Clinche | 285/315 |
| 6,709,019 B2 * | 3/2004 | Parrott et al. | 285/1 |
| 6,890,004 B2 * | 5/2005 | Naito | 285/93 |
| 2002/0005641 A1 * | 1/2002 | Imai | 285/316 |
| 2002/0063426 A1 * | 5/2002 | Ose | 285/316 |
| 2003/0057698 A1 * | 3/2003 | Parrott et al. | 285/1 |
| 2005/0046178 A1 * | 3/2005 | Sato et al. | 285/81 |
| 2005/0121906 A1 * | 6/2005 | Tiberghien et al. | 285/316 |

FOREIGN PATENT DOCUMENTS

| | | |
|---|---|---|
| EP | 184799 A2 * | 6/1986 |
| EP | 0813264 A2 | 12/1997 |
| WO | WO00/52779 | 9/2000 |
| WO | WO02/077511 A1 | 10/2002 |

* cited by examiner

RAPID COUPLING DEVICE FOR HYDROGEN STORAGE CANISTER

CROSS-REFERENCES TO RELATED APPLICATIONS

This application is a continuation-in-part of Ser. No. 10/428,466, filed on May 2, 2003 now abandoned entitled "Rapid Coupling Device for Hydrogen Storage Canister".

FIELD OF THE INVENTION

The invention relates to a connecting device for a hydrogen storage canister and a rapid coupling device therein; in particular, to a connecting device that can conveniently detach the hydrogen storage canister.

DESCRIPTION OF THE RELATED ART

Recently, air pollution is more severe, and most of it comes from exhaust gas generated by gasoline engines. Thus, the pollution generated by the gasoline engine is worthy of consideration. To improve environmental quality, it is important to replace polluting gasoline engines with non-polluting fuel cells.

The structure and types of fuel cells are less relevant with this invention, their detailed description is omitted. Currently, fuel cells can be applied in many areas including the aerospace and military, power generation, and transportation areas. It is noted that fuel cells operate by combining oxygen and hydrogen, wherein oxygen is directly provided by the environment, and hydrogen is usually supplied by a hydrogen storage canister containing pure hydrogen.

Since fuel cells and their peripheral equipment are still undergoing research, the technology is immature. For example, when a fuel cell is placed in an engine module of an electric scooter, the hydrogen storage canister must communicate with the fuel cell via a connecting device. Conventionally, a commercial quick connection device is used. Commercial quick connection devices, however, have the following disadvantages. The large size of a commercial quick connection device requires the fuel cell to occupy more space. The operation of a commercial quick connection device requires two steps, it is difficult to detach. Additionally, the commercial quick connection device is detached by rotation, and the device therein is easily damaged.

SUMMARY OF THE INVENTION

In view of this, the invention provides a rapid coupling connecting device for a hydrogen storage canister that conveniently detaches from the hydrogen storage canister.

Accordingly, the invention provides a rapid coupling device for a hydrogen storage canister. The rapid coupling device communicates the hydrogen storage canister and a fuel cell. The hydrogen storage canister includes a connecting assembly. The rapid coupling device includes a base and a communicating member. The communicating member communicates with the fuel cell, and is connected to the base. When the hydrogen storage canister is coupled to the fuel cell via the connecting assembly, the communicating member is abutted by the connecting assembly so that hydrogen in the hydrogen storage canister flows to the fuel cell through the connecting assembly and the communicating member.

In a preferred embodiment, the rapid coupling device further includes a moving member, an abutting member, and a separating member. The moving member is disposed in the base in a manner such that the moving member moves between a first position and a second position. The abutting member is moveably disposed on the base. When the moving member is located at the first position, the abutting member is abutted by the moving member. When the moving member is located at the second position, the abutting member is abutted by the connecting assembly. The separating member is disposed on the base in a manner such that the separating member moves between a third position and a fourth position. When the separating member is located at the third position, the abutting member is abutted by the connecting assembly. When the separating member is located at the fourth position, the abutting member is not abutted by the connecting assembly.

Furthermore, the abutting member is a steel ball, and the base is formed with a through hole in which the abutting member is disposed.

The rapid coupling device further includes an extension member, a rod, a first elastic member, and a second elastic member. The extension member is connected to the separating member, and the rod is connected to the extension member. The first elastic member, surrounding the base, is abutted by the separating member and the communicating member respectively so as to move the separating member between the third position and the fourth position. The second elastic member, surrounding the communicating member, is abutted by the moving member and the communicating member respectively so as to move the moving member between the first position and the second position.

In another preferred embodiment, the communicating member includes a groove, and the rapid coupling device further includes a first seal member disposed in the groove.

In another preferred embodiment, the communicating member is formed with a hollow portion communicating with the fuel cell, and includes an ejector member, a third elastic member, and a second seal member. The ejector member is moveably disposed in the hollow portion of the communicating member to control the communication between the outside and the hollow portion of the communicating member. The third elastic member is disposed in the hollow portion in a manner such that the third elastic member is abutted by the ejector member, and maintains the ejector member at a predetermined position. The second seal member is disposed on the ejector member to seal the ejector member and the hollow portion.

In this invention, a connecting device for communicating a hydrogen storage canister and a fuel cell is provided. The connecting device includes a first connecting assembly and a second connecting assembly. The first connecting assembly communicates with the fuel cell, and includes a base and a communicating member connected to the base. The second connecting assembly includes a first ejector member, and is disposed in the hydrogen storage canister and connected to the first connecting assembly in a detachable manner. When the second connecting assembly is connected to the first connecting assembly, the communicating member is abutted by the first ejector member so that hydrogen in the hydrogen storage canister flows to the fuel cell through the second connecting assembly and the first connecting assembly.

In a preferred embodiment, the second connecting assembly further includes a body, a valve, and a seal member. The body includes a concave portion, and is disposed in the hydrogen storage canister. The valve is disposed in the body, and the first ejector member is moveably disposed in the valve. The seal member is disposed in the concave portion.

In this invention, another rapid coupling device for a hydrogen storage canister including a connecting assembly is provided. The rapid coupling device includes a base and a communicating member. The communicating member is connected to the base. When the hydrogen storage canister is coupled to the rapid coupling device via the connecting assembly, the communicating member is abutted by the connecting assembly so that hydrogen in the hydrogen storage canister flows to the rapid coupling device through the connecting assembly and the communicating member.

BRIEF DESCRIPTION OF THE DRAWINGS

The present invention can be more fully understood by reading the subsequent detailed description and examples with references made to the accompanying drawings, wherein:

FIG. 1b is a top view of the connecting device as shown in FIG. 1a;

FIG. 5 is a top perspective view of the stopper shown in FIG. 1a; and

DETAILED DESCRIPTION OF THE INVENTION

Figure 1A:
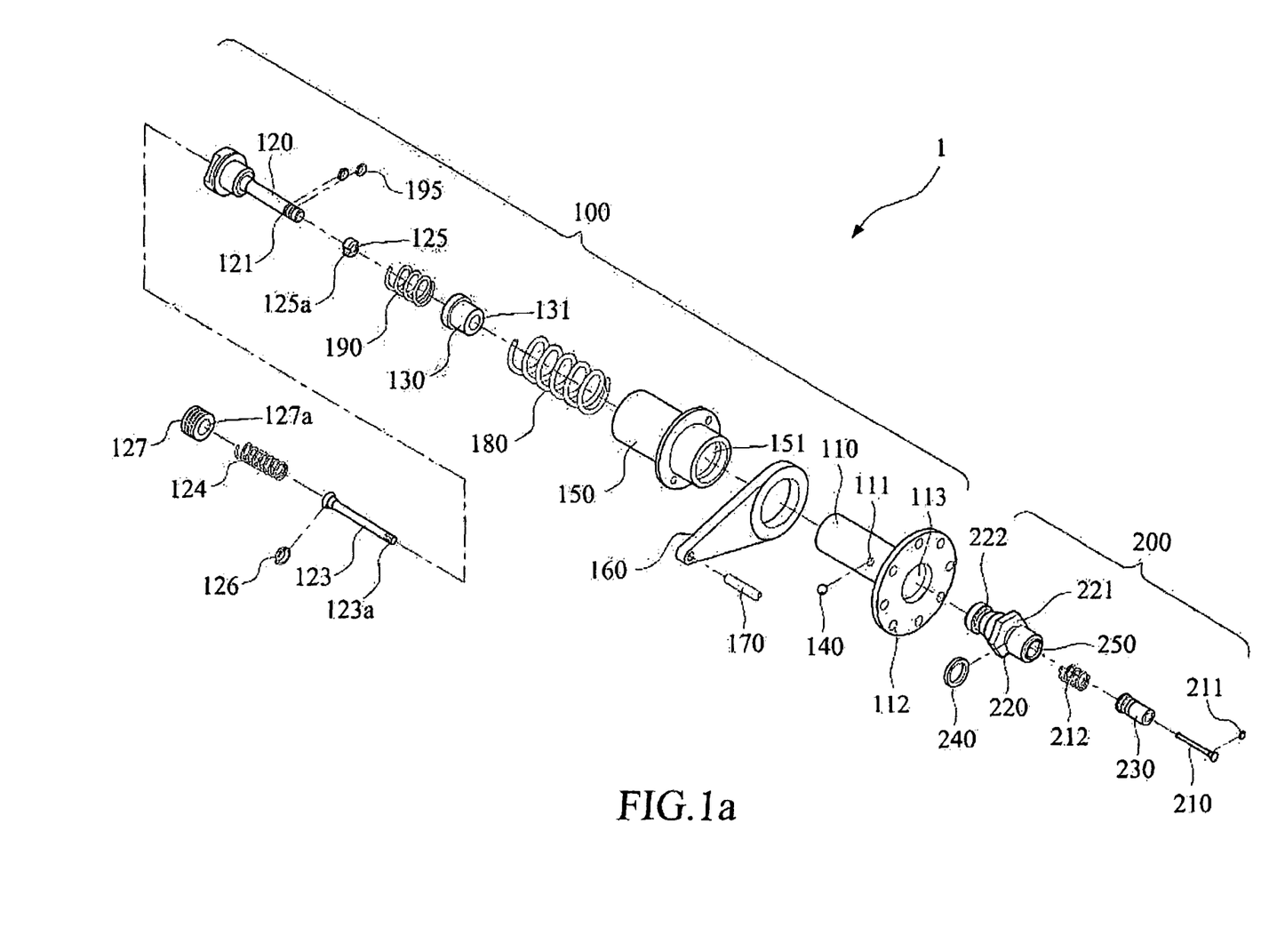
FIG. 1a is an exploded view of a connecting device for a hydrogen storage canister as disclosed in this invention.
Figure 1B:
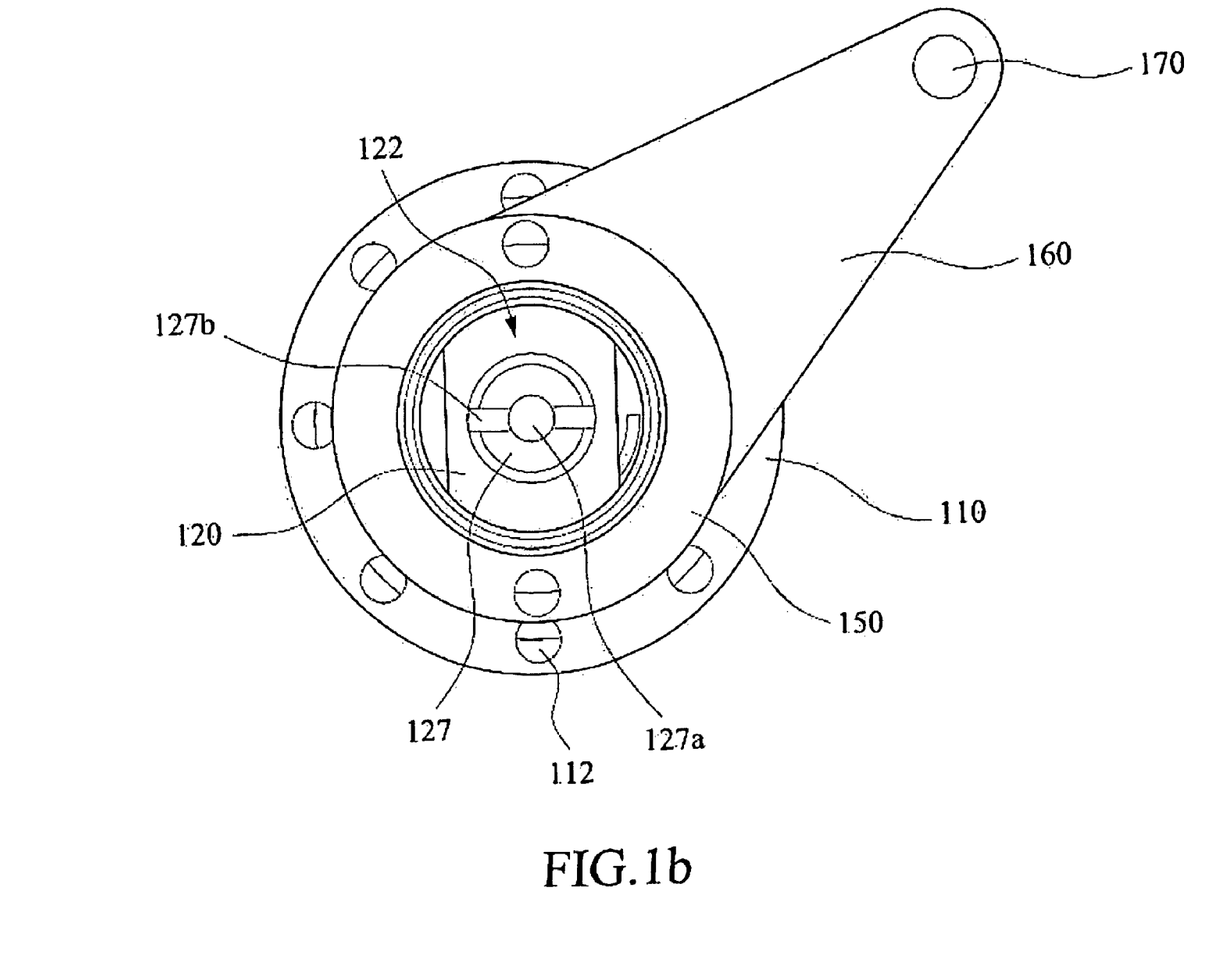
Figure 2A:
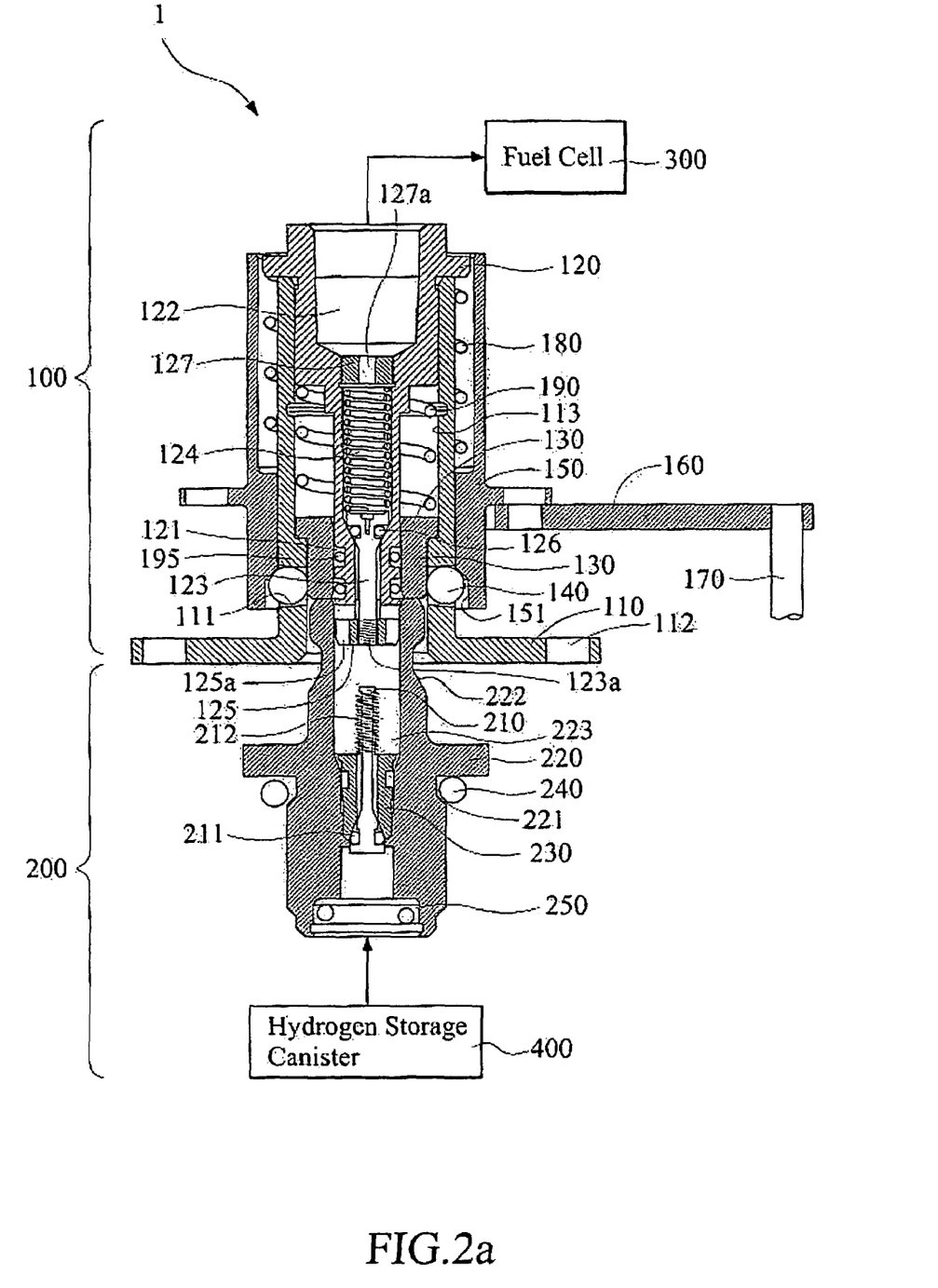
FIG. 2a is a cross section of the connecting device in FIG. 1a, wherein a first connecting assembly is not connected to a second connecting assembly.

Referring to FIG. 1a and FIG. 2a, a connecting device 1 as disclosed in this invention is provided, and is used for communicating a hydrogen storage canister 400 and a fuel cell 300. The connecting device 1 includes a first connecting assembly 100 and a second connecting assembly 200. The first connecting assembly 100 is used as a rapid coupling device for the hydrogen storage canister 400 as disclosed in this invention.

As shown in FIG. 1a and FIG. 2a, the first connecting assembly 100 communicates with the fuel cell 300, and includes a base 110, a communicating member 120, a moving member 130, a plurality of abutting members 140, a separating member 150, an extension member 160, a rod 170, a first elastic member 180, a second elastic member 190, and two first seal members 195. It is noted that only one abutting member 140 is shown in FIG. 1a.

The base 110 is used as a body of the first connecting assembly 100, and is formed with a plurality of fixed holes 112 so as to be fixed. In addition, the base 110 is formed with a plurality of transverse through-holes 111 in which the abutting members 140 are disposed. It is noted that only one through hole 111 is shown in FIG. 1a. The base 110 is formed with a longitudinally extending interior chamber 113 therein.

The communicating member 120 is coaxially received in the interior chamber 113 of the base 110, and is formed with two grooves 121 in which the first seal members 195 are disposed. The communicating member 120 is formed with a hollow portion 122 as shown in FIG. 2a, and includes a first ejector member 123, a third elastic member 124, and a second seal member 126. The hollow portion 122 communicates with the fuel cell 300.

The first ejector member 123 is moveably disposed in the hollow portion 122 of the communicating member 120 to control the communication between the outside and the hollow portion 122 of the communicating member 120. The third elastic member 124 is disposed in the hollow portion 122 and between a stopper 127 and the first ejector member 123 in a manner such that the third elastic member 124 is abutted by the first ejector member 123, and maintains the first ejector member 123 at a predetermined position. It is understood that the third elastic member 124 may be a compression spring.

Figure 5:
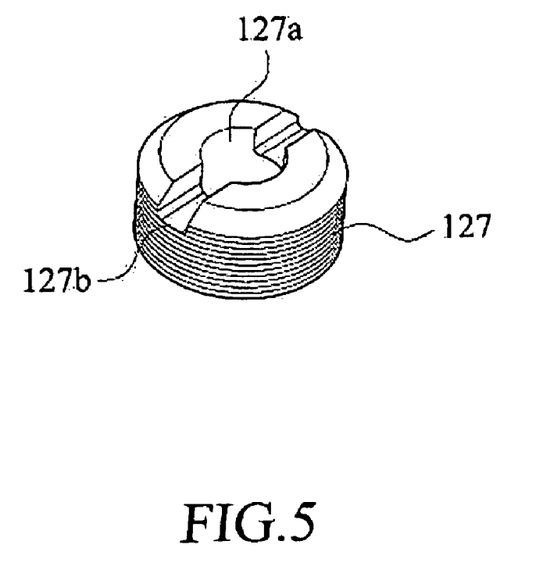

A central communication hole 127a is formed in the stopper 127 for providing a communication channel between the outside and the hollow portion 122 of the communicating member 120, as shown in FIG. 5. Preferably, a crosscut slot 127b is formed on a top surface of the stopper 127 for facilitating rotation by screwdriver.

Figure 6:
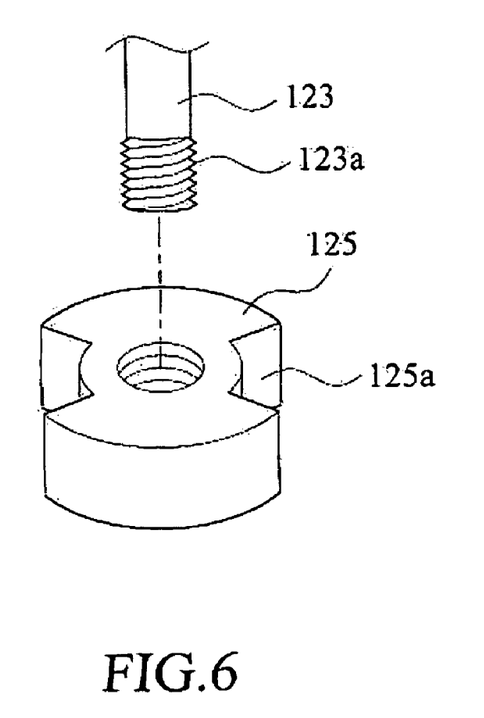
FIG. 6 is an exploded view showing the end member is screwed on a threaded distal end of the first ejector member.

With reference to FIG. 6, a disk member 125 with an inner threaded central bore is screwed on a threaded distal end 123a of the first ejector member 123. The disk member 125 is formed with at least one longitudinal communication channel 125a.

The second seal members 126 are disposed on the first ejector member 123 to seal the first ejector member 123 and the hollow portion 122. Thus, the communicating member 120 may be used as a channel communicating the outside and the first connecting assembly 100.

The moving member 130 is coaxially received in the interior chamber 113 of the base 110 and one end of the moving member 130 is projected from the communicating member 120. The moving member 130 is formed therein a longitudinally extending bore 131. A distal end of the communicating member 120 is coaxially received in the bore 131 of the moving member 130.

When the second connecting assembly 200 is not connected to the first connecting assembly 100, the moving member 130 is located at a position as shown in FIG. 2a (hereinafter referred to as a first position) so as maintain the abutting member 140 at a predetermined position. When the second connecting assembly 200 is connected to the first connecting assembly 100, the moving member 130 is located at a position as shown in FIG. 2b (hereinafter referred to as a second position) so that the abutting member 140 is away from the predetermined position and may move in a predetermined range.

Each of the abutting members 140 is disposed in the through-hole 111 of the base 110 in a manner such that it is moved in a predetermined range. When the first connecting assembly 100 is inserted by the second connecting assembly 200, the second connecting assembly 200 is fixed in the first connecting assembly 100 by the abutting members 140. It is understood that each of the abutting members 140 may be a steel ball as shown in FIG. 1a. Furthermore, as shown in FIG. 2a, when the moving member 130 is located at the first position, the abutting member 140 is abutted between the moving member 130 and a circumferential groove 151 formed on an interior surface of the separating member 150. When the moving member 130 is located at the second position, the abutting member 140 is abutted by the second concave portion 222 of the body 220 of the second connecting assembly 200.

The separating member 150 is coaxially disposed on an exterior of the base 110, and separates the second connecting assembly 200 from the first connecting assembly 100.

Figure 2B:
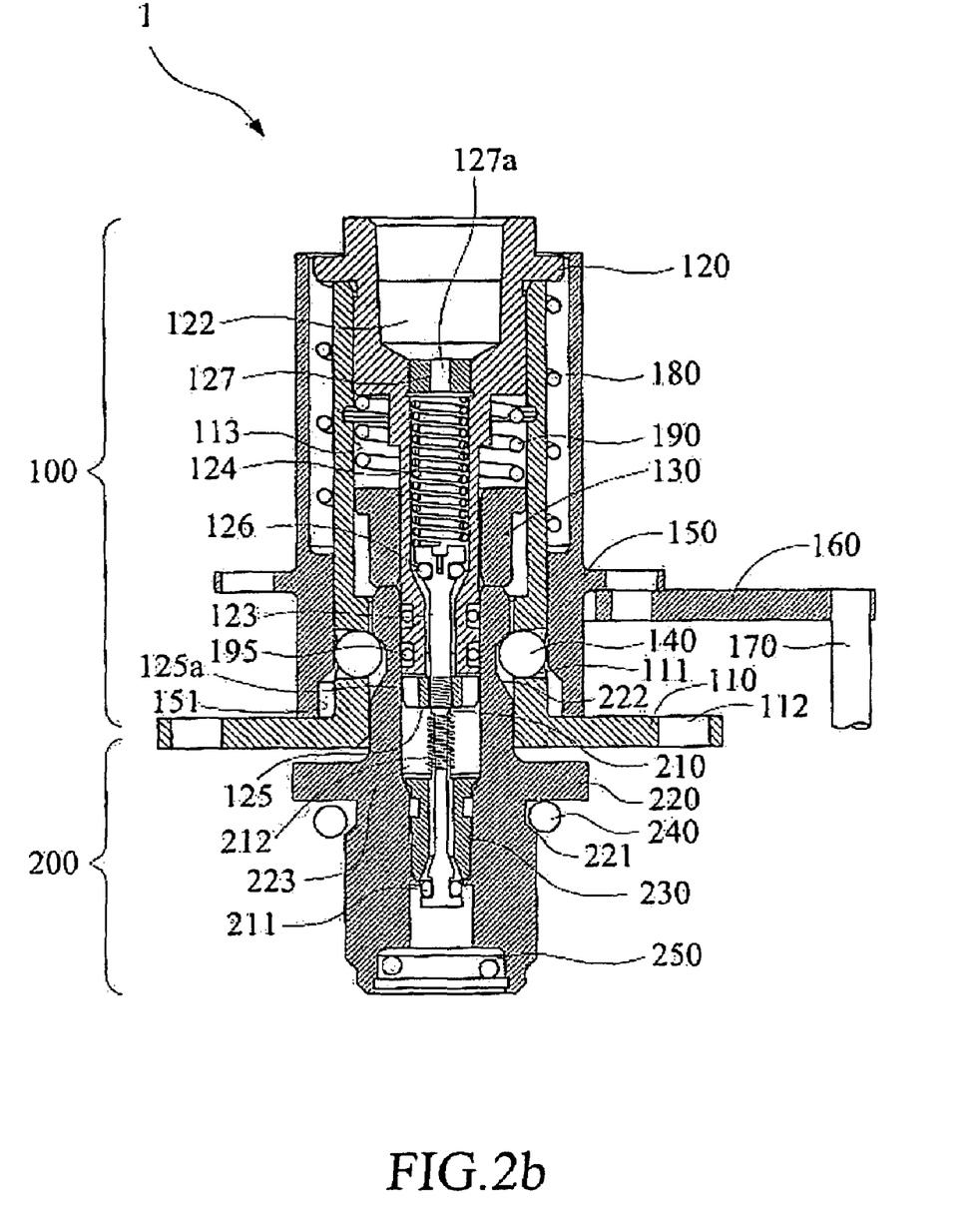
FIG. 2b is a cross section of the connecting device in FIG. 1a, wherein the first connecting assembly is connected to the second connecting assembly.
Figure 2C:
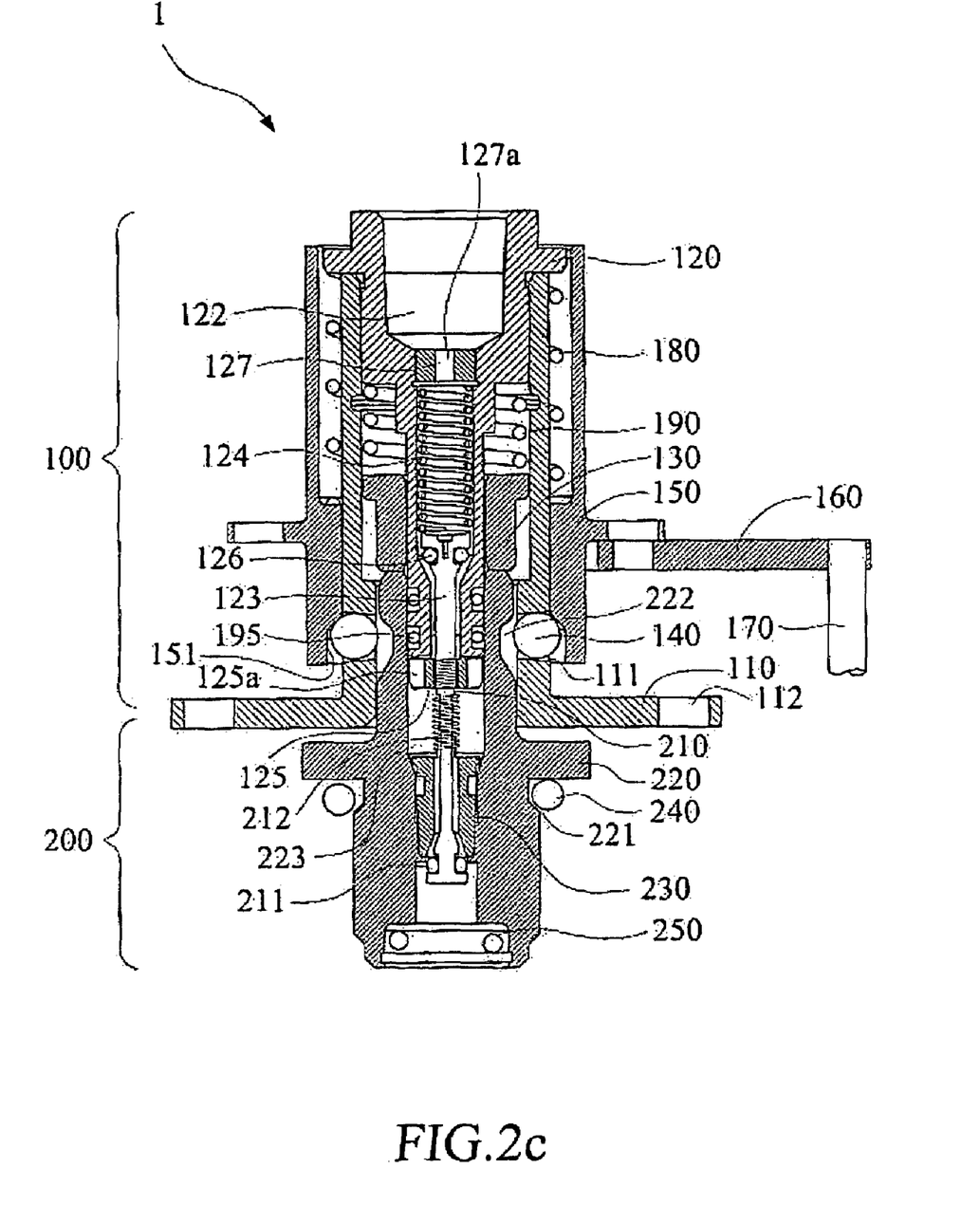
FIG. 2c is a cross section of the connecting device in FIG. 1a, wherein a separating member is moved to a fourth position.

When the second connecting assembly 200 is connected to the first connecting assembly 100, the separating member 150 is biased at a position as shown in FIG. 2b (hereinafter referred to as a third position) so as to be abutted by the abutting members 140. Thus, the abutting members 140 are abutted by the second connecting assembly 200 so that the second connecting assembly 200 is kept in the first connecting assembly 100. When the second connecting assembly 200 is separated from the first connecting assembly 100, the separating member 150 is longitudinally displaceable on the base 110 to a position, as shown in FIG. 2c (hereinafter referred to as a fourth position). At this time, since the separating member 150 is moved upward, the abutting members 140 are moved outward. Thus, the second connecting assembly 200 cannot be abutted by the abutting members 140 so that the second connecting assembly 200 cannot be kept in the first connecting assembly 100. As a result, the second connecting assembly 200 can be separated from the first connecting assembly 100.

The extension member 160 is connected to the separating member 150, and the rod 170 is connected to the extension member 160. By means of the extension member 160 and the rod 170, the separating member 150 can be easily operated by the user.

As shown in FIG. 2b and FIG. 2c, the first elastic member 180 surrounds the base 110. The first elastic member 180 is abutted by the separating member 150 and the communicating member 120 respectively so as to move the separating member 150 between the third position and the fourth position. It is noted that the first elastic member 180 may be a compression spring.

As shown in FIG. 2a and FIG. 2b, the second elastic member 190 surrounds the communicating member 120, and is abutted by the moving member 130 and the communicating member 120 respectively so that the moving member 130 is biased in a first position and longitudinally displaceable in the base 110 to a second position. It is noted that the second elastic member 190 may be a compression spring.

The first seal members 195 are disposed in the grooves 121 of the communicating member 120, and prevent air from entering through a gap between the communicating member 120 and the moving member 130. Each of the first seal members 195 may be an O-ring.

Referring to FIG. 1a and FIG. 2a, the second connecting assembly 200 is disposed in the hydrogen storage canister 400 and communicates with the hydrogen storage canister 400, and is connected to the first connecting assembly 100 in a detachable manner. The second connecting assembly 200 includes a body 220, a valve 230, a second ejector member 210, a third seal member 240, and a filter member 250.

The body 220 is used as a main component of the second connecting assembly 200, and is formed with an interior chamber 223 and a first concave portion 221 in which the third seal member 240 is disposed. The valve 230 is disposed in the body 220, and the second ejector member 210 is moveably disposed in the valve 230. The third seal member 240 is disposed in the first concave portion 221 of the body 220 so as to seal the second connecting assembly 200 and the hydrogen storage canister 400. The body 220 is further formed with a second concave portion 222 adjacent to a top end thereof. The filter member 250 is disposed in the body 220, and filters hydrogen passing through the second connecting assembly 200.

It is noted that the second ejector member 210 is moveably kept in the valve 230 by an elastic member 212 which may be a compression spring.

A forth seal member 211 is disposed on the second ejector member 210 to seal the second ejector member 210 and the valve 230. The forth seal member 211 may be an O-ring.

Figure 3:
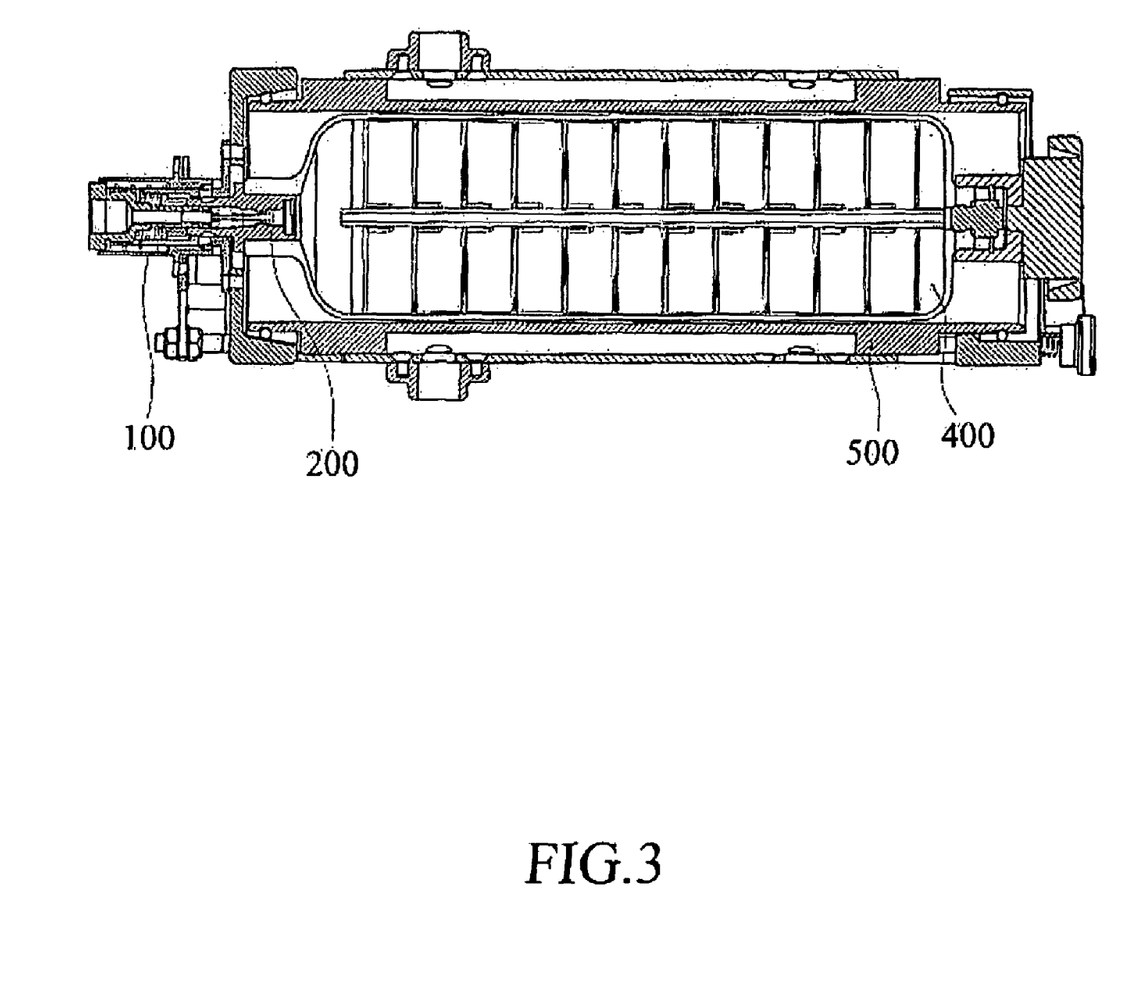
FIG. 3 is a schematic view of the connecting device assembled on a hydrogen storage canister.

Referring to FIG. 3, the second connecting assembly 200 is mounted on of the hydrogen storage canister 400, and the first connecting assembly 100 is connected to the second connecting assembly 200. The hydrogen storage canister 400 may be contained in a container 500, and the first connecting assembly 100 may be further firmly secured to the container 500 by means of the extension member 160 and the rod 170.

Figure 4:
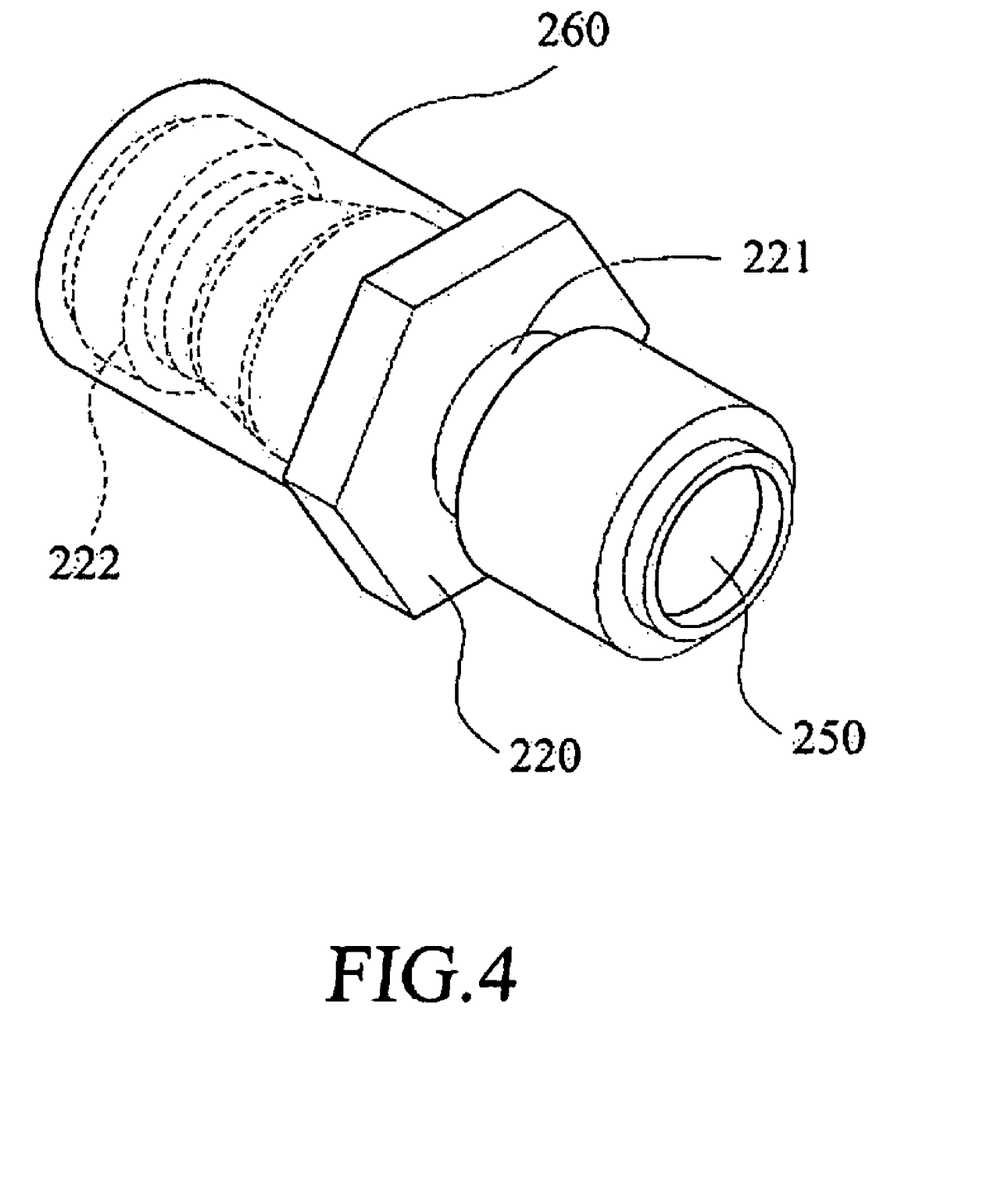
FIG. 4 is a schematic view of an embodiment of the second connecting assembly as disclosed in this invention.

Furthermore, referring to FIG. 4, the connecting device 1 further includes a cover 260. When the second connecting assembly 200 is not connected to the first connecting assembly 100, the cover 260 is disposed on the second connecting assembly 200 so as to protect the second connecting assembly 200 on the hydrogen storage canister 400. In addition, since the cover 260 may be made of plastic that is lighter material, it can detect whether hydrogen in the hydrogen storage canister 400 has improperly leaked out. Specifically, when the hydrogen storage canister 400 is subjected to improper treatment so that received hydrogen leaks out, the cover 260 will be separated from the second connecting assembly 200. Thus, an abnormal situation may be easily observed by the user.

The structure of the connecting device 1 is described above, and its operation is described as follows referring to FIGS. 2a-2c.

To connect the second connecting assembly 200 and the first connecting assembly 100, the top end of the body 220 is first abutted by the moving member 130 as shown in FIG. 2a while the second ejector member 210 is not abutted by the first ejector member 123. Then, the body 220 is moved upward to press the second elastic spring 190 via the moving member 130 until the second ejector member 210 is abutted by the first ejector member 123 of the communicating member 120 as shown in FIG. 2b. At this time, since the second ejector member 210 is abutted by the first ejector member 123, a gap is formed between the second ejector member 210 and the valve 230. Also, the first ejector member 123 is moved upward by the second ejector member 210 and thereby the second seal member 126 is separated from the inner wall of the communicating member 120. Thus, hydrogen in the hydrogen storage canister 400 can pass through the gap between the valve 230 and the second ejector member 210 and flow to the fuel cell 300 through the communication channel 125a of the disk member 125, the central communication hole 127a of the stopper 127, and the hollow portion 122 of the communicating member 120. Finally, the abutting members 140 are moved inward so as to be abutted by the second concave portion 222 of the body 220, and the second connecting assembly 200 is kept in the first connecting assembly 100.

To separate the second connecting assembly 200 from the first connecting assembly 100, the separating member 150 is moved upward to press the first elastic member 180 as shown in FIG. 2c. At this time, the abutting members 140 can be moved outward due to the movement of the separating member 150, and it is separated from the body 220. Thus, the second connecting assembly 200 can be separated from the first connecting assembly 100. It is noted that the first ejector member 123 can be pressed back to a fixed position by the third elastic member 124 at this time, and the second seal member 126 can be abutted by the inner wall of the communicating member 120 again. Thus, ambient air can be prevented from entering the communicating member 120.

When the first ejector member 123 is moved along the hollow portion 122 of the communicating member 120, the disk member 125 is moved along the interior surface of the interior chamber 223 of the body 220, so that the first ejector member 123 is moved smoothly and the second seal members 126 is tightly seal the first ejector member 123 and the hollow portion 122 when the moving member 130 is located at the first position.

The connecting device of this invention has the following advantages. Since the connecting device of this invention is designed for a hydrogen storage canister and fuel cell, its size can be minimized. Thus, the space required by the fuel cell can be minimized. Since the hydrogen storage canister can be separated from the fuel cell by simply moving the separating member, it is conveniently detached. Since the detachment is performed in a linear manner without rotation, the device therein avoids damage.

It is understood that the fuel cell is used as an object that the hydrogen storage canister supplies in this description. However, in practice, it is not limited to this; that is the connecting device of this invention can be applied to other equipment that requires a hydrogen storage canister to supply hydrogen.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A rapid coupling device for coupling to a connecting assembly having formed therein a longitudinal chamber in communication with a fluid conduit, the rapid coupling device comprising:
    a base, said base having formed a longitudinally extending interior chamber, and at least one transverse through-hole formed in a wall of said base;
    a moving member coaxially received in the interior chamber of the base, the moving member having formed therein a longitudinally extending bore, wherein the moving member is biased to a first position corresponding to disconnection of said connecting assembly from said rapid coupling device, and is longitudinally displaceable in the interior chamber of the base to a second position corresponding to coupling of said connecting assembly with said rapid coupling device;
    a communicating member formed with a hollow portion and coaxially received in the interior chamber of the base, a distal end of the communicating member being coaxially received in the bore of the moving member, at least one first seal member disposed on the communicating member to seal a gap formed between the communicating member and the moving member;
    a separating member coaxially disposed on an exterior of the base in surrounding relationship therewith and biasedly movable therealong, the separating member having formed on an interior surface thereof a circumferential groove, the separating member being biased to assume a third position by a force exerted onto said separating member by a first elastic member positioned between said separating and communicating member, said third position corresponding to coupling of said connecting assembly with said rapid coupling device, and said separating member being longitudinally displaceable on alone the base to a fourth position corresponding to disconnection of said connecting assembly from said rapid coupling device;
    at least one abutting member selectively displaceable in said at least one transverse through-hole of the base, said at least one abutting member being disposed in the circumferential groove of the separating member in contact with an outer surface of said moving member when the moving member is in the first position thereof, and the least one separating member is in the fourth position thereof and said at least one abutting member being forced to move to the interior chamber of the base when the moving member is in the second position and the separating member is in the third position, wherein once said at least one abutting member remains in said circumferential groove of said separating member, said at least one abutting member prevents said member from leaving said fourth position thereof;
    an ejector member moveably disposed in the hollow portion of the communicating member;
    at least one second seal member disposed on the ejector member to seal a gap between the ejector :member and the hollow portion of said communicating member; and
    an elastic member, disposed in the hollow portion of said communicating member, in a manner such that the elastic member is being abutted by the ejector member;
    wherein the moving member is longitudinally displaced relative to the communicating member by insertion of the connecting assembly into the rapid coupling device, thereby exposing the distal end of the communicating member longitudinally beyond the moving member, wherein the distal end of the communicating member is received in the longitudinal chamber of the connecting assembly and retained therein when the moving member is in the second position and the separating member is in the third position.

2. The rapid coupling device as claimed in claim 1, wherein said at least one abutting member is a steel ball.

3. The rapid coupling device as claimed in claim 1, further comprising:
    an extension member connected to the separating member; and a rod connected to the extension member.

4. The rapid coupling device as claimed in claim 1, wherein:
    said first elastic member, surrounds the base and is retained at opposing ends thereof by the separating member and the communicating member, wherein said first elastic member biases the separating member toward the third position.

5. The rapid coupling device as claimed in claim 1, further comprising:
    a second elastic member surrounding the communication member and retained at opposing ends thereof by the moving member and the communicating member, wherein said second elastic member biases the moving member toward the first position.

6. The rapid coupling device as claimed in claim 1, wherein the ejector member further comprises a disk member disposed on a distal end of the ejector member the disk member being formed with at least one longitudinal communication channel; and
    wherein, when the ejector member is moved along the hollow portion of the communicating member, the disk member is moved along the longitudinal chamber of the connecting assembly, and wherein the second seal members seal a gap between said ejector member and the communicating member when the moving member is located at the first position.

7. The rapid coupling device as claimed in claim 1, further comprising a stopper disposed in the hollow portion of the communicating member to maintain the ejector member in the hollow portion and between the ejector member and the stopper, the stopper being formed with a central communication hole.

8. A rapid coupling device for coupling a hydrogen storage canister to a fuel cell, the rapid coupling device including a connecting assembly having formed therein a longitudinally extending chamber in communication with the hydrogen fluid canister, the rapid coupling device comprising:

a base: said base having a longitudinally extending interior chamber, and at least one transverse through-hole formed in a wall of said base;

a moving member coaxially received in the interior chamber of the base, the moving member having formed therein a longitudinally extending bore, wherein the moving member is biased in to a first position corresponding to disconnection of said connecting assembly from said rapid coupling device, and is longitudinally displaceable in the interior chamber of said base to a second position corresponding to coupling of said connecting assembly with said rapid coupling device;

a communicating member formed with a hollow portion and coaxially received in the interior chamber of the base, a distal end of the communicating member being coaxially received in the bore of the moving member;

a separating member coaxially disposed on an exterior of the base in surrounding relationship therewith and biasedly movable therealong, the separating member having formed on an interior surface thereof a circumferential groove, the separating member being biased to assume a third position by a force exerted onto said member by a first elastic member positioned between said separating and communicating member, said third position corresponding to coupling of said connecting assembly with said rapid coupling device, and said separating member being longitudinally displaceable along the base to a fourth position corresponding to disconnection of said connecting assembly from said rapid coupling device;

at least one abutting member selectively displaceable in said at least one transverse through-hole of the base, said at least one abutting member being forced to move into the circumferential groove of the separating member in contact with an outer surface of said moving member when the moving member is in the first position and the separating member is in the fourth position, and the said at least one abutting member being forced to move to the interior chamber of the base when the moving member is in the second position and the separating member is in the third position, wherein, once said at least one abutting member remains in said circumferential groove of said separating member, said at least one abutting member prevents said separating member from leaving said fourth position thereof; and at least one first seal member disposed on the communicating member to seal a gap formed between the communicating member and the moving member;

an ejector member, moveably disposed in the hollow portion of the communicating member;

at least one second seal members disposed on the ejector member to seal a gap defined between the ejector member and the communicating member; and an elastic member, disposed in the hollow portion of said communicating member, the elastic member being abutted by the ejector member;

wherein the moving member is longitudinally displaced relative to the communicating member by insertion of the connecting assembly into the rapid coupling device, thereby exposing the distal end of the communicating member longitudinally beyond the moving member, wherein the distal end of the communicating member is received in the longitudinal chamber of the connecting assembly and retained therein when the moving member is in the second position and the separating member is in the third position, thereby forming a fluid communication passage for hydrogen from the hydrogen storage canister to flow through both the rapid coupling device and the connecting assembly via the communicating member into the fuel cell when the hydrogen storage canister is coupled to the rapid coupling device via the connecting assembly.

9. The rapid coupling device as claimed in claim 8, wherein said at least one abutting member is a steel ball.

10. The rapid coupling device as claimed in claim 8, further comprising:
    an extension member connected to the separating member; and
    a rod connected to the extension member.

11. The rapid coupling device as claimed in claim 8, wherein:
    said first elastic member surrounds the base and is retained at opposing ends thereof by the separating member and the communicating member, wherein said first elastic member biases the separating member toward the third position.

12. The rapid coupling device as claimed in claim 8, further comprising:
    a second elastic member, surrounding the communicating member and retained at opposing ends thereof by the moving member and the communicating member, wherein said second elastic member biases the moving member toward the first position.

13. The rapid coupling device as claimed in claim 8, wherein the ejector member further comprises a disk member disposed on a distal and of the ejector member, the disk member being formed with at least one longitudinal communication channel; and
    wherein, when the ejector member is moved along the hollow portion of the communicating member, the disk member is moved along the longitudinal chamber of the connecting assembly, and wherein the second seal members seal a gap defined between said ejector member and the communicating member when the moving member is located at the first position.

14. The rapid coupling device as claimed in claim 8, further comprising a stopper disposed in the hollow portion of the communicating member to maintain the ejector member in the hollow portion and between the ejector member and the stopper, the stopper being formed with a central communication hole.

15. The rapid coupling device as claimed in claim 1, wherein the circumferential groove comprises a longitudinally directed wall portion and an angled wall portion, said at least one abutting member being locked in the circumferential groove by said angled wall portion thereof in contact with the outer surface of said moving member when the moving member is in the first position.

16. The rapid coupling device as claimed in claim 8, wherein the circumferential groove comprises a longitudinally directed wall portion and an angled wall portion, said at least one abutting member being locked in the circumferential groove by said angled wall portion thereof in contact with the outer surface of said moving member when the moving member is in the first position.

* * * * *